United States Patent Office 2,865,812
Patented Dec. 23, 1958

2,865,812
METABOLIC PROCESS FOR PRODUCTION OF GIBBERELLIC ACID

Antony Borrow, Edward Garstang Jefferys, and Ian Stewart Nixon, Welwyn, England, assignors to Imperial Chemical Industries Limited, London, England, a corporation of Great Britain No Drawing. Application December 26, 1956
Serial No. 630,467

Claims priority, application Great Britain December 30, 1955

3 Claims. (Cl. 195—36)

This invention relates to improved metabolic processes, in particular to metabolic processes used for the production of gibberellic acid.

In copending United States patent application Serial Number 518,226 there are described processes of producing gibberellic acid, a new organic acid identified in that application, comprising cultivating an active strain of the mold *Gibberella fujikuroi*. The mould may be cultivated in a stirred, aerated nutrient solution, which, when the mould has reached a suitable stage of growth, is filtered and extracted. The extract contains gibberellic acid which, on further treatment, may be obtained in crystalline form.

Five strains of the mould have been deposited with the United States Department of Agriculture, Northern Utilization Research and Development Division, Peoria, Illinois. These strains have been added to the permanent collection of micro-organisms and have been assigned the following numbers: NRRL 2633, NRRL 2634, NRRL 2635, NRRL 2636 and NRRL 2637.

We have now found that the yield of gibberellic acid from such an aerated culture may be increased by introducing carbon dioxide into the nutrient solution in addition to air.

This result is surprising in that the initial effect of the carbon dioxide is to decrease the rate of growth of the mycelium. The increased yield of gibberellic acid is, however, probably due to stimulation of the mycelium whereby the rate of production is increased in the early stages and maintained for a longer time after cessation of active growth, the latter effect probably being the major one.

An increase in yield is obtained over a wide range of proportions of carbon dioxide but preferably a proportion not greater than 10% by volume of the air introduced into the culture is used since above this proportion the suppression of the rate of growth of the mycelium becomes an increasingly important factor and the time taken to achieve useful yields of gibberellic acid may become unduly long.

Other factors such as the rate of aeration per unit volume of nutrient solution have an effect on the improvement in yield and at an air flow rate of about 0.5 vol. air/vol. culture/min. a carbon dioxide proportion of about 5% by volume gives a useful improvement in yield.

Conveniently the carbon dioxide may be introduced in the air stream, the carbon dioxide being of course additional to that normally present in air.

The invention is illustrated by the following examples:

EXAMPLE I

A comparison of the effect of adding carbon dioxide in aeration of a culture of *Gibberella fujikuroi* was carried out using two 30 litre fermenters. The same culture medium containing 16% dextrosol and 0.24% ammonium nitrate as the principal nutrients was used in each fermenter and the inoculum, agitation and temperature (26.2° C.) were also identical. The yield of gibberellic acid in milligrams per litre of each culture filtrate is shown in the following Table I.

Table I
GIBBERELLIC ACID YIELD, MG./LITRE CULTURE FILTRATE

| Aeration Conditions | 20 litres air per minute | 19 litres air +1 litre $CO_2$ per minute |
|---|---|---|
| Time from inoculation, Hrs.: | | |
| 161 | Nil | 8 |
| 233 | 70 | 110 |
| 258 | 120 | 146 |
| 329 | 226 | 316 |
| 401 | 348 | 408 |
| 497 | 484 | 516 |
| 570 | 456 | 578 |
| 664 | 498 | 630 |
| 905 | | 594 |

EXAMPLE II

A further comparison of the effect of adding carbon dioxide in aeration of a culture of *Gibberella fujikuroi* was carried out using two 80 litre fermenters. The same culture medium containing 16% dextrose and 0.24% ammonium nitrate as principal nutrients was used in each fermenter and the inoculum, agitation and temperature (26.5° C.) were also identical. The yield of gibberellic acid in milligrams per litre of each culture filtrate is shown in the following Table II.

Table II
GIBBERELLIC ACID YIELD, MG./LITRE CULTURE FILTRATE

| Aeration conditions | 40 litres air +1.5 litres $CO_2$/min. | 40 litres air/min. |
|---|---|---|
| Time from inoculation, Hrs.: | | |
| 160 | 58 | |
| 235 | | 150 |
| 237 | 220 | |
| 259 | | 173 |
| 280 | 316 | |
| 283 | | 233 |
| 306 | | 259 |
| 328 | 380 | |
| 331 | | 288 |
| 400 | 508 | |
| 402 | | 348 |
| 426 | | 426 |
| 448 | 576 | |
| 450 | | 324 |
| 474 | | 648 |
| 496 | 612 | |
| 498 | | 372 |
| 569 | 542 | |
| 570 | | 420 |
| 594 | | 463 |
| 616 | 620 | |
| 619 | | 418 |

What we claim is:
1. A process of preparing gibberellic acid comprising the cultivation of an active strain of *Gibberella fujikuroi* in an areated nutrient solution characterised in that carbon dioxide is also introduced into the solution.
2. A process as claimed in claim 1 in which carbon dioxide is introduced in a proportion not greater than 10% by volume of the air used for aeration.
3. A process as claimed in claim 1 in which carbon dioxide is introduced in a proportion of about 5% by volume of the air used for aeration.

References Cited in the file of this patent

Cross: J. Chem. Soc., December 1954, pp. 4670–4676.
Stodola et al.: Arch. Biochem. and Biophysics, vol. 54, No. 1, January 1955, pp. 240–245.
Curtis and Cross: Chemistry and Industry (August 28, 1954), page 1066.